United States Patent [19]
Giegerich

[11] 3,736,804
[45] June 5, 1973

[54] PULLEY ASSEMBLY
[75] Inventor: Raymond W. Giegerich, South Haven, Mich.
[73] Assignee: Lovejoy, Inc., River Forest, Ill.
[22] Filed: Mar. 26, 1971
[21] Appl. No.: 128,245

[52] U.S. Cl. .................... 74/230.17 C, 74/230.17 M
[51] Int. Cl. ............................................. F16h 9/18
[58] Field of Search ............... 74/230.17 C, 230.17 M

[56] References Cited
UNITED STATES PATENTS 3,386,300  6/1968  Maurey et al. ................ 74/230.17 C
3,624,716  11/1971  Jaeschke ..................... 74/230.17 M
3,628,389  12/1971  Wiegelmann ................ 74/230.17 M

*Primary Examiner*—C. J. Husar
*Attorney*—Parker, Plyer & McEachran

[57] ABSTRACT

A variable speed pulley having a fixed and a movable disk, the movable disk being urged by a cartridge assembly of spring covers urged apart by a plurality of spaced springs and means for drawing said covers together.

6 Claims, 7 Drawing Figures

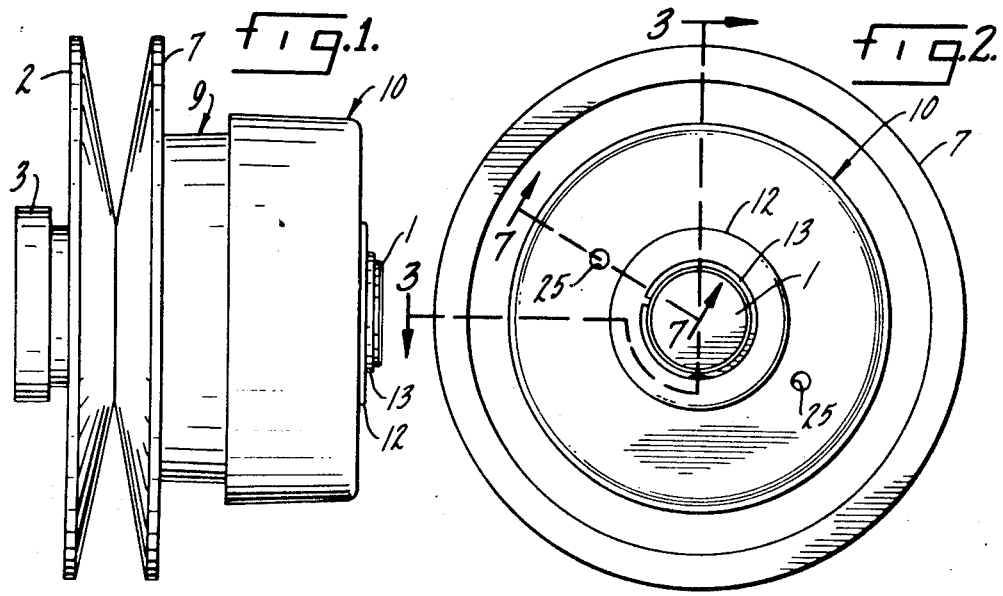
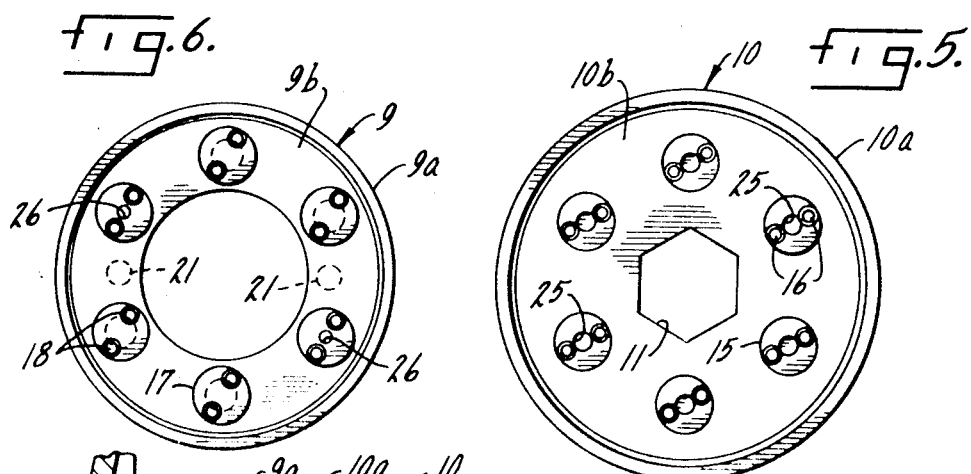
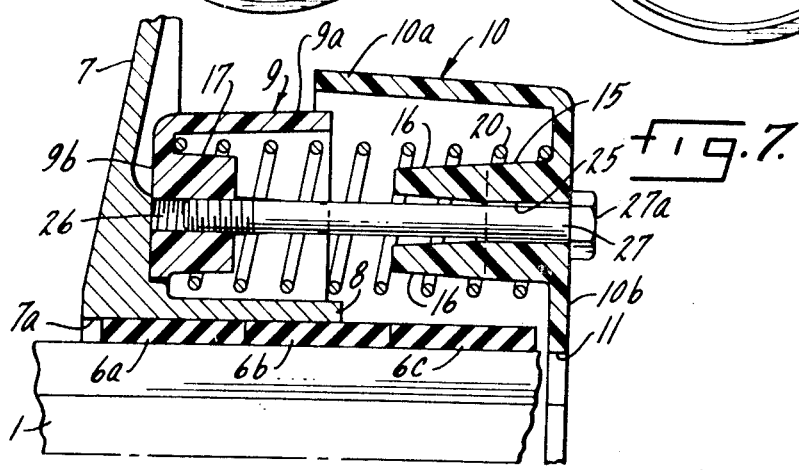
INVENTOR
RAYMOND W. GIEGERICH
BY Parker, Carter & Markey
ATTORNEYS

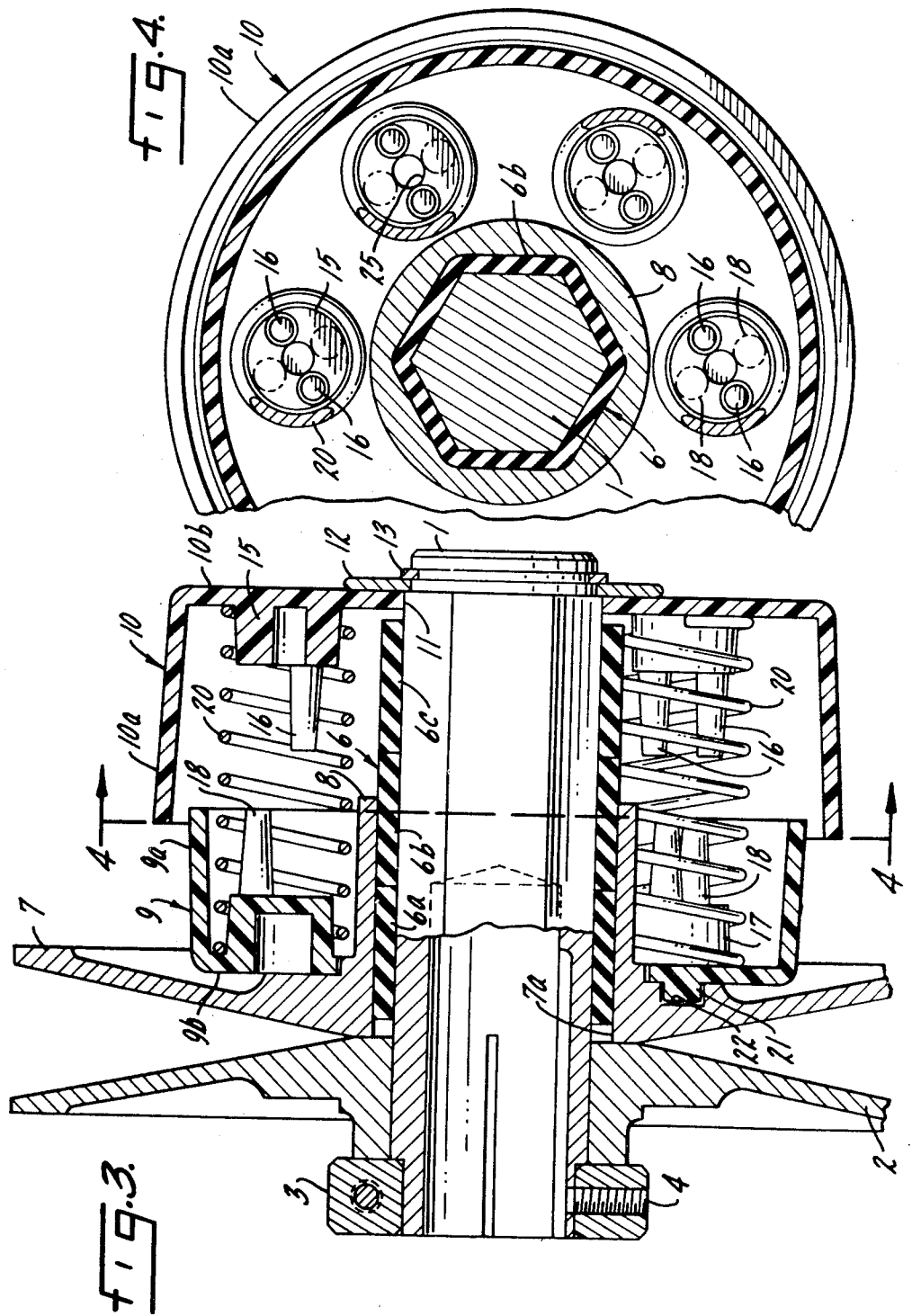

PULLEY ASSEMBLY

SUMMARY OF THE INVENTION

This invention relates to variable speed pulleys and has as one of its purposes the provision of a pulley having a plurality of advantages over those available in the past.

Another purpose of the invention is the provision of a variable speed pulley assembly including a spring cartridge removable as a unit.

Another purpose is to provide a variable speed pulley having a movable disk urged by a plurality of circumferentially spaced spring assemblies.

Another purpose is to provide a variable speed pulley having a movable disk urged toward a fixed disk by a selectable number of individual spring assemblies.

Another purpose is to provide a variable-speed pulley having safety disassembly features.

Another purpose is to provide a variable speed pulley including means for varying the range of power capacity thereof.

Another purpose is to provide a variable speed pulley including a variable number of spring assemblies by means of which the power capacity of the pulley may be varied.

Other purposes may appear from time to time during the course of the specification and claims.

BRIEF DESCRIPTION OF THE DISCLOSURE

The invention is illustrated more or less diagrammatically in the accompanying drawings, wherein:

FIG. 1 is a side view;

FIG. 2 is an end view;

FIG. 3 is a view taken on the line 3—3 of FIG. 2 and on an enlarged scale;

FIG. 4 is a partial view taken on the line 4—4 of FIG. 3;

FIG. 5 is an inside view of a spring cover of the invention;

FIG. 6 is an inside view of another spring cover of the invention; and

FIG. 7 is a view taken on the line 7—7 of FIG. 3 and on an enlarged scale.

Like parts are indicated by like numerals throughout the specification and drawings.

DESCRIPTION OF THE PREFERRED EMBODIMENT

Referring now to the drawings, the numeral 1 designates a rotatable pulley shaft. A front or fixed pulley disk 2 is fixed, as by press-fitting for example, on shaft 1 for rotation therewith, a shaft collar 3 abutting disk 2 and held on shaft 1 by any suitable means such as a setscrew (not shown) for which provision is made as indicated at 4. A bushing member 6, formed of rubberlike material, surrounds the portion of shaft 1 beyond disk 2 from collar 3 and is preferably formed in three bushing segments indicated at 6a, 6b and 6c. A movable or rear pulley disk 7 is centrally bored, the bore 7a in disk 7 and continuing through the central axially disposed rearward extension 8 engaging the bushing member 6. An inner cup-shaped spring cover 9 is movable with the disk 7. An outer cup-shaped spring cover 10 is positioned to receive the cover 9, in nesting relationship, when disk 7 moves toward cover 10. The cover 10 has its rear or bottom wall 10b centrally apertured in the noncircular configuration of shaft 1 for close fit on shaft 1 as indicated at 11. A back-up plate 12 is held against the outer rear surface of cover 10 and on shaft 1 by retaining ring 13.

The cover members 9,10 include circumferential walls 9a, 10a, respectively. Cover 10 includes bottom wall 10b and cover 9 includes an inwardly extending annular flange or wall configuration 9b. It will be observed that the members 9,10 are formed entirely and integrally of a suitable plastic. Circumferentially spaced within member 10 and extending inwardly from the inner surface of wall 10b thereof is a plurality of spring-positioning boss elements 15. Each of the elements 15 includes spaced projections 16. Similarly, the portion 9b of member 9 includes inwardly extending spring-positioning boss configurations 17 from which projection members 18 project for interpenetration with the projections 16 when the members 9 and 10 are moved together. As may be best seen for example in FIG. 3, elements 15–18 are also formed of a suitable plastic and preferably integrally with covers 9,10. A plurality of yielding members, such as the springs indicated at 20, are provided for circumferential spacing within and between the members 9,10, each of the springs 20 having their opposite ends engaging the members 9,10 and located or positioned by a set of the structures 15,18 and substantially out of contact with any metal parts.

It will be observed that six spring-positioning structures 15–18 are spaced circumferentially within the area defined by members 9,10 and that springs 20 may be selectively provided for all of said structures or for a lesser number thereof.

Indicated at 21,22, respectively, is a dowel or location pin and socket configuration operative between disk 7 and cover 9.

As best seen in FIG. 7 through-holes 25 are diametrically spaced on cover 10 and penetrate associated bosses 15. Threaded holes 26 are formed in diametrically spaced bosses 17 in cover 9. Bolts 27 are threaded in holes 26, extend through holes 25 and carry heads 27a against the outer surface of cover 10.

The bearing member 6 is the only part subject to wear in the pulley of the invention. It may be easily and simply replaced in the field or at the operating site, it being only necessary that the operator remove ring 13, slide elements 7, 9, 10 and 12 rearwardly off shaft 1, replace the bearing member 6 thereon, and slide the members 7–12 back into the position shown in FIG. 1.

Unitary removal and replacement of covers 9,10 with springs 20 is facilitated by the structure illustrated at 25,27a. Heads 27a are rotated by a simple hand tool to draw covers 9,10 together, compressing springs 20 and releasing pressure on ring 13. Upon replacement, heads 27a are merely reversed to bring cover 10 again against ring 13. Similarly, bolts 27 may be run out full length to relax springs 20 for spring replacement without "explosion" of the springs and consequent potential for injury to maintenance personnel.

The provision of a plurality of axially displaced coil springs provides for maximum variation, with maximum ease, of the horsepower transmission of a given system or power capacity of the pulley of the invention. The number of springs 20 may be increased or decreased to provide such variance through a substantial range.

The embodiments of the invention in which an exclusive property or privilege is claimed are defined as follows:

1. In a variable speed pulley assembly, a pair of spring covers, spring means urging said covers in opposite directions and release means including a bolt member threadably engaging one of said covers and extending beyond the other of said covers, whereby rotation of said bolt member in one direction compresses said spring means and draws said covers together.

2. The structure of claim 1 wherein said spring means comprises a plurality of circumferentially spaced springs positioned between and within said covers.

3. The structure of claim 2 characterized by and including spring positioning elements projecting inwardly from each of said covers.

4. In a variable speed pulley, a shaft, a pair of pulley disks rotatable with said shaft, a pair of spring covers rotatable with said shaft, spring means urging said covers in opposite directions, said means including a plurality of circumferentially spaced individual springs enclosed by said covers and positioned by circumferentially spaced spring locator configurations on the opposed walls of said covers, and means rotatable in one of said covers and threadably engaging the other of said covers and effective upon rotation to move said covers toward and away from each other to compress and relax said springs.

5. The structure of claim 4 wherein said covers are slidably carried on said shaft and characterized by and including abutment means removably carried on said shaft and positioned to abut said covers against retrograde movement on said shaft.

6. In a variable speed pulley, a shaft, a pair of pulley disks rotatable with said shaft and spring means urging said covers in opposite directions, means rotatable in one of said covers and threadably engaging the other of said covers and effective upon rotation of said rotatable means to move said covers toward and away from each other to compress and relax said spring means.

* * * * *